United States Patent [19]
Proska et al.

[11] Patent Number: 4,895,503
[45] Date of Patent: Jan. 23, 1990

[54] DEVICE TO PRODUCE MOLDED PLASTIC PARTS FROM A FLOWABLE REACTION MIXTURE

[75] Inventors: Ferdinand Proska, Leverkusen; Hans M. Sulzbach, Koenigswinter; Ferdinand Althausen, Neunkirchen; Reiner Raffel, Siegburg, all of Fed. Rep. of Germany

[73] Assignee: Maschinenfabrik Hennecke GmbH, Leverkusen, Fed. Rep. of Germany

[21] Appl. No.: 259,370

[22] Filed: Oct. 18, 1988

[30] Foreign Application Priority Data

Oct. 24, 1987 [DE] Fed. Rep. of Germany ....... 3736022

[51] Int. Cl.⁴ ............................................. B29C 45/27
[52] U.S. Cl. .................................. 425/127; 425/544; 425/557; 425/567
[58] Field of Search ............... 425/110, 117, 120, 121, 425/123, 127, 543, 544, 557, 558, 567

[56] References Cited

U.S. PATENT DOCUMENTS 3,995,981 12/1976 Fries ..................................... 425/242
4,680,003 7/1987 Schulte et al. ....................... 425/206
4,743,188 5/1988 Gray et al. ........................... 425/567

FOREIGN PATENT DOCUMENTS 2103451 8/1972 Fed. Rep. of Germany .

Primary Examiner—Jay H. Woo
Assistant Examiner—Timothy W. Heitbrink
Attorney, Agent, or Firm—Joseph C. Gil

[57] ABSTRACT

To avoid contaminating the sprue runner which leads from the mixing device to the molding cavity of a molding tool for the production of molded plastic, especially foam plastic, parts, an insertable lining is placed in the sprue runner and can be removed along with the molded part.

5 Claims, 4 Drawing Sheets

DEVICE TO PRODUCE MOLDED PLASTIC PARTS FROM A FLOWABLE REACTION MIXTURE

BACKGROUND OF THE INVENTION

The present invention is directed to a device to produce molded plastic parts, especially foam parts, using a flowable reaction mixture. The device broadly consists of a molding tool with a mixhead. A sprue runner leads from the outlet of the mixhead to the molding cavity.

To produce molded plastic parts, e.g., molded foam parts, using a flowable reaction mixture which forms a polyurethane or polyurethane foam, a molding tool with a mixhead which is either permanent, or is in place only while the mixture passes through it, is generally used. Most often, ejection piston mixheads are used because of their self-cleaning ability. Other types of mixheads can also be used. No matter which mixhead type is used, when a sprue runner which leads from the outlet of the mixhead to the mold cavity, is used, this sprue runner is contaminated with the remnant of the reaction mixture. The remnant of the reaction mixture contains unmixed or incompletely mixed reaction components. These contaminants must be removed to guarantee the production of high quality molded parts. The cleaning is done either with a compressed air pistol or with solvents. Both methods discharge waste into the environment. The cleaning also unnecessarily prolongs the cycle time for the part production. This lost time adds up to a considerable cost factor in the course of a work shift.

The object of the present invention was to design a device of the type mentioned above, where a contamination of the sprue runner by unmixed or poorly mixed reaction components would be avoided in order to shorten the production cycle of the molded parts by eliminating the cleaning time.

DESCRIPTION OF THE INVENTION

Figure 1:
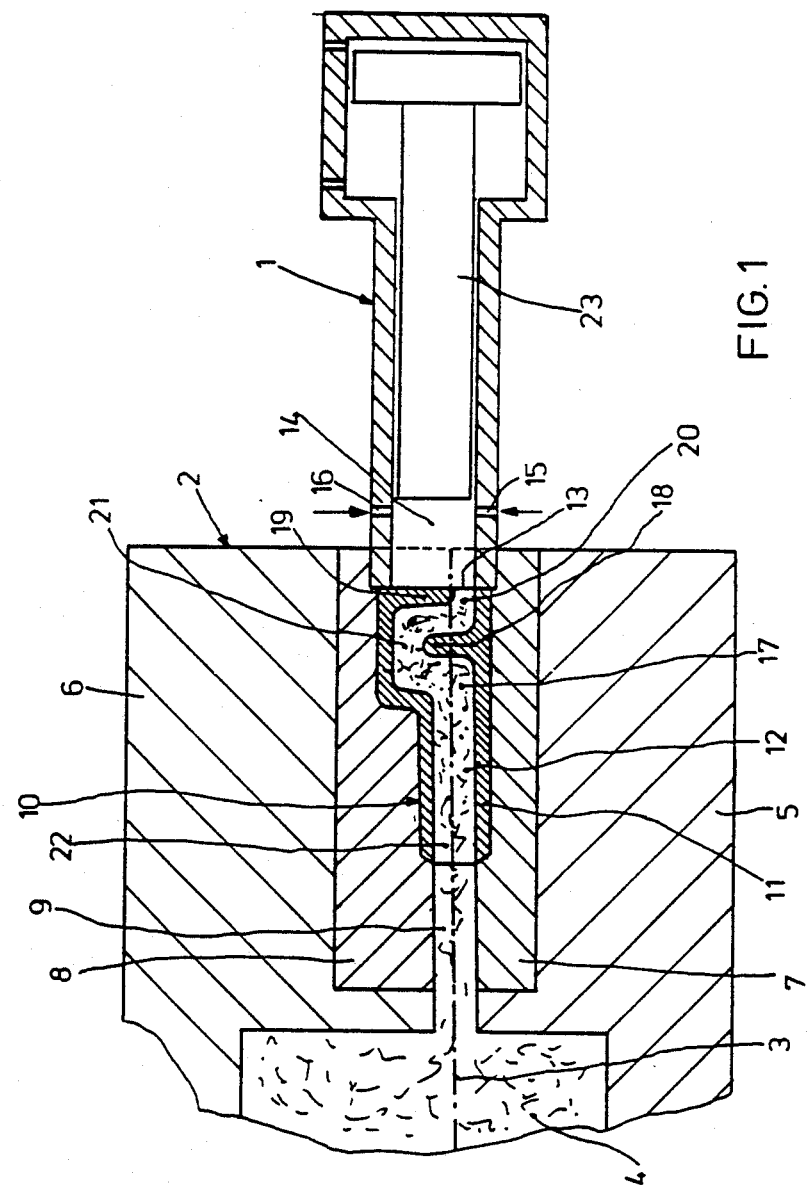
FIGS. 1, 2 and 3 are cross-sectioned views of three different embodiments of the present invention.

The above problem is solved by using a sprue runner whose sides consist at least partially of an insertable lining which can later be removed together with the molded part.

Because the critical area of the sprue runner is in general the part directly adjacent the outlet of the mixhead, the insertable lining is positioned so that the last portion of the reaction mixture injected, touches only the inner part of the flowchannel of the lining, hardens there, and can be removed along with the molded part. Thus, no disturbing contamination of the sprue runner can occur. Clearly the lining must be rigid enough to be dimensionally stable. If the separation plane of the mold passes through the sprue runner, it is possible to insert the lining planarly. Otherwise, the lining must be inserted axially. In this case the molding tool must also open axially to permit the lining and the hardened mixture in the lining to be removed.

Of course, a lining which is used only once is a cost factor. However, experiments and calculations have shown that the costs induced by contaminants (loss of production, solvents and cleaning time) can be cut roughly in half despite the fact that a lining is used.

It was not obvious that the lining would fulfill the intended purpose. It was even feared that reaction mixture would penetrate between the effective wall of the sprue runner and the lining, which would have resulted in the opposite effect than the desired one.

Normal sprue runners are usually shaped in such a way as to stabilize the flow through them. It is useful to keep this concept in mind when designing the shape of the flowchannel of the lining. Following another preferred design, the flowchannel has at least one constriction. In this way any desired mixchamber pressure can be set. Both these preferred designs are even more effective if they are combined with yet another preferred design. The geometry of the space in the sprue in which the lining fits is the same regardless of the internal flowchannel geometry.

If the outer geometry of linings is standardized, the same device can be used for different chemical systems where variations in viscosity, intermixing, and the like, of the reaction mixture change the optimal inner geometry of the flowchannel.

Preferably the outlet of the mixhead and the inlet of the lining are equipped with matching centered sealing gaskets. This guarantees that the reaction mixture will not leak behind the lining. Especially for foam molding installations it is advantageous to incorporate automated supply and implantation equipment for the linings. This is done relatively easily for foam molding installations. Most commercial installations are suitable as long as they are able to turn, align and supply the corresponding objects in the desired cycle.

The lining can be made of any suitable material as long as it has the required rigidity. Plastics, especially waste plastics, are especially preferred. There are no problems involved with producing the linings using injection molding techniques. If the geometry of the flowchannel is complicated and it would be difficult to remove the piece, two halves are manufactured via injection molding and then welded or glued together.

In the figures, the new design is sketched schematically.

In FIG. 1, the installation consists of an ejection piston mixhead 1 and a molding tool 2, which is composed of the halves 5, 6. The mold halves enclose a molding cavity 4 and are separated by a separation plane 3, represented in FIG. 1 by a broken dashed line.

The lugpanels 7, 8, which enclose a sprue runner 9, also are separated by the separation plane 3. Together the lugpanels form a recess 10, in which a lining 11, made of waste polypropylene, fits exactly. This lining can be inserted when the molding tool 2 is opened and it can be removed together with the molded part and the hardened mixture 12 within the sprue. The lining 11 attaches directly to the outlet 13 of the mixing chamber 14 of the mixhead 1. Two injection openings 15, 16, for reaction components, lead into the mixing chamber 14. The flowchannel 17 of the lining 11, which is a part of the sprue runner 9, has two constrictions 20, 21 produced by two protruding parts 18, 19. The cross section of the downstream part widens after each turn and therefore stabilizes the flow. Since the ejection piston 23 can be pushed the whole way through to the outlet 13 (to show the mixing chamber 14, the piston is shown in a mixing position) the whole mixing chamber and sprue runner will be free of contaminants after the molded part is removed.

Figure 2:
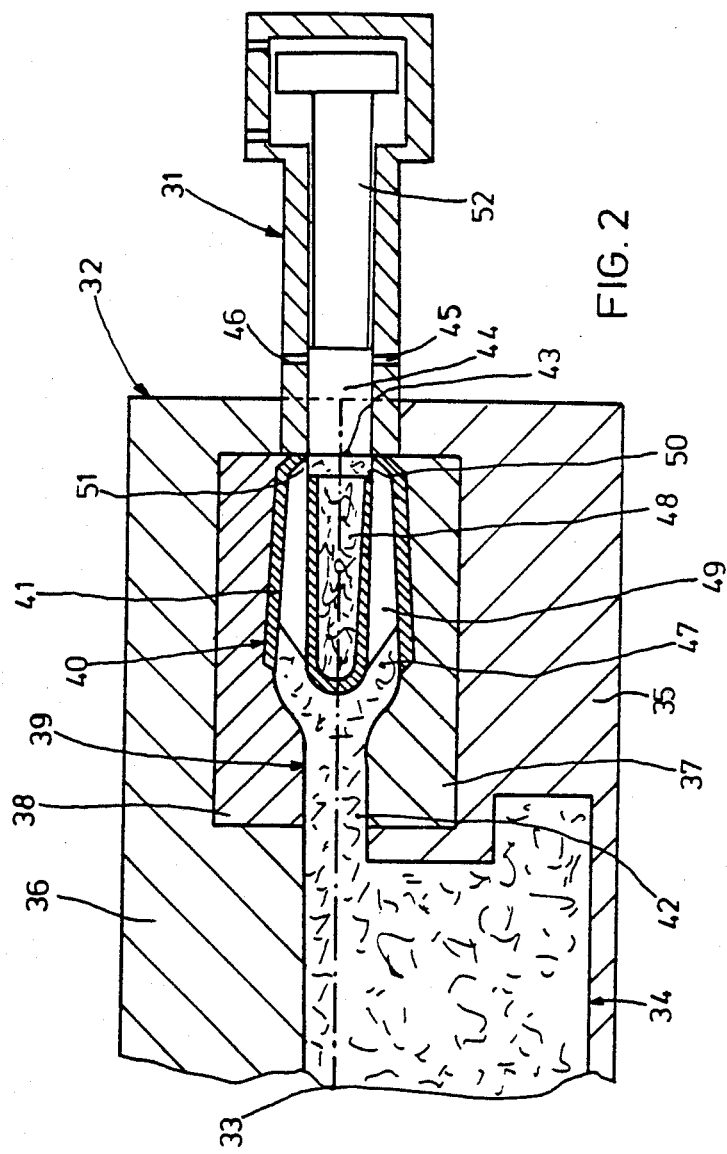

In FIG. 2, the installation consists of an ejection piston mixhead 31 and a molding tool 32 which is again composed of two halves 35, 36. The mold halves enclose a molding cavity 34 and are separated by a separation plane 33, represented by a broken dashed line. Also separated by the separation plane 33 are lugpanels 37, 38 enclosing a sprue runner 39. The lugpanels also form a recess 40, in which a lining 41, made of plastic, fits exactly. This lining can be inserted when the molding tool 32 is opened and it can be removed along with the produced molded part and the hardened mixture, 42, within the sprue. The lining 40 attaches directly to the outlet 43 of the mixing chamber 44 of the mixhead 31. Two injection openings 45, 46, for the reaction components, lead into the mixing chamber 44. The flowchannel 47 of the lining 41, which is a part of the sprue runner 39, has a central collecting chamber 48 which is connected by ledges 49 to the actual lining 40. The bypass gap located between the upper rim 50 of the collecting chamber 48 and the lining 41 is a constriction 51. The diffuser shaped cross sectional increase of the flowchannel 47 serves to stabilize the flow. The ejection piston 52 can be pushed the whole way to the outlet 43 (it is represented in mixing position to show the mixing chamber 44) so that the whole mixing device and sprue runner will be free of contaminants after the molded part is removed.

Figure 3:
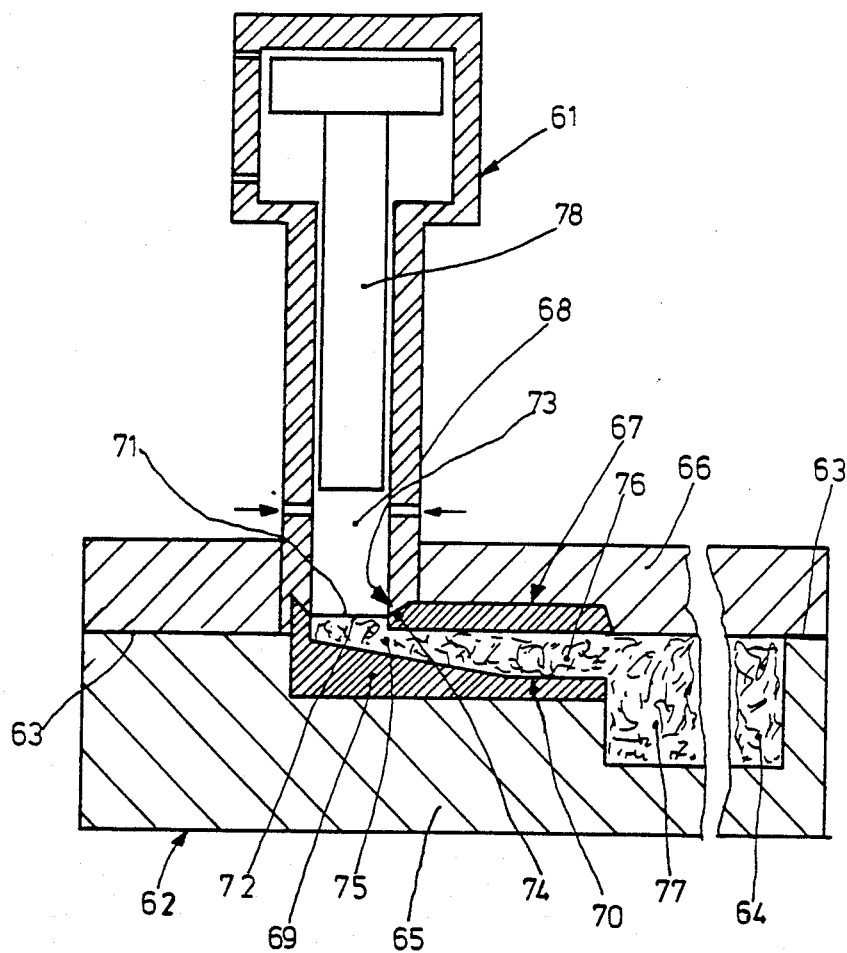

In FIG. 3, the installation consists of an ejection piston mixhead 61 and a molding tool 62 which is again composed of two halves 65, 66. The two halves enclose a molding cavity 64 separated by the separation plane 63. The lining 69, containing a sprue runner 70, is fit into the recess 67 perpendicular to the mixing chamber 68 of the mixhead 61. The lining was produced by an injection molding technique with plastic. This lining 69, which is connected to the outlet of the mixing chamber 68, can be inserted into the recess 67 when the molding tool 61 is opened. To obtain a good connection, centered gaskets 73, 74 are placed on the outside of the outlet 71 and on the inside of the inlet 72 of the lining 69. They form a seal when pressed against each other. The sprue runner 70 widens after the constriction 75 and thus stabilizes the flow. The lining 69 can be removed—together with the hardened mixture 76 and the molded part 77. The ejection piston 78 (which is drawn in mixing position to illustrate the mixing chamber 69) can be advanced to the outlet 71 in order to have the whole mixing device and sprue runner free of contaminants when the molded part is removed.

Figure 4:
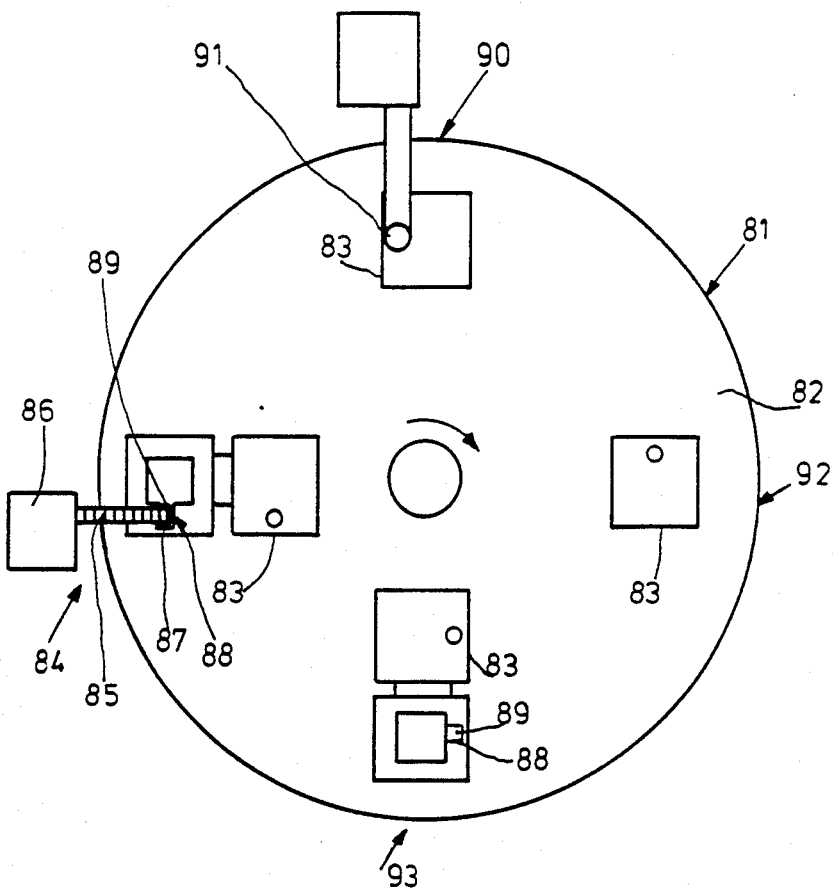
FIG. 4 is a top view of a foam molding installation.

In FIG. 4, the foam molding installation 81 consists of a turn-table 82 on which four molding tools 83 are arranged. As the turn-table 82 goes through a cycle, the molding tools 83 stop at different stations.

At station 84, a lining 87 is taken from a magazine 86 by a supply and implantation installation 85 and inserted into the recess 88 of the sprue runner 89 of the open molding tool 83. At the next station, 90, the molding tool 83 is closed, a mixhead 91 is attached to it and the reaction mixture is produced and injected into the molding tool 83. At station 92 the hardening takes place while the molding tool 83 stays closed. At station 93, the molding tool 83 is opened and the molded part is removed along with the lining and the hardened mixture therein. Then the cycle starts again.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus to produce molded plastic parts from a flowable reaction mixture comprising:
   (i) a molding tool having a mold cavity and being connected to a mixing device for mixing reactive components to form said flowable reaction mixture, said mixing device having inlets for said components and an outlet for said flowable mixture,
   (ii) a sprue runner leading from said outlet to said cavity and allowing said mixture to flow from said outlet to said cavity, the walls of said runner being made at least partially of an insertable preformed lining which can be removed along with the molded part, wherein said lining is attached directly to said outlet.

2. The apparatus of claim 1, wherein the flowchannel of the lining is designed to stabilize the flow of the reaction mixture.

3. The apparatus of claim 1, wherein said lining is made of waste plastic.

4. The apparatus of claim 1, wherein the outlet of the mixing device and the inlet of the lining are equipped with matching centered sealing gaskets.

5. The apparatus of claim 2, wherein said flowchannel has at least one constriction.

* * * * *